United States Patent Office 3,326,696
Patented June 20, 1967

3,326,696
DRY COMPOSITION FOR PRODUCING PUDDINGS, CUSTARD, AND BABY FOOD
Coenraad Decnop, Bussum, Netherlands, assignor to Amylo Chemie N.V., Koog aan de Zaan, Netherlands, a Dutch company
No Drawing. Filed Sept. 2, 1965, Ser. No. 484,746
Claims priority, application Netherlands, Sept. 7, 1964, 6,410,371
8 Claims. (Cl. 99—139)

The invention relates to a dry composition for producing puddings, custard, baby food and the like, and to a process for preparing the same.

It is known that compositions comprising a cold-water-dispersible starch product together with sugar and phosphates are very suitable as dry instant pudding mixes. In such compositions, the sugar serves the role of a sweetening agent and of an agent to prevent lump formation on addition of milk, whilst the phosphates are incorporated for giving a good gelation of the milky paste made from the dry composition.

Normally, there is needed a large quantity of sugar to result in a good prevention of lump formation and this fact may cause some objections to the consumer in view of the sweet taste. A further disadvantage of the prior art compositions is that the phosphates must be a mixture of ortho phosphates and pyrophosphates in order to provide good gelation characteristics.

There have already been made some proposals to prevent lump formation in a different way. According to U.S. Patent No. 2,554,143, it is proposed to mix the cold-water-dispersible starch product with a hydrophobic substance, such as an oil, fat or wax, which coats the starch particle just sufficiently to prevent too rapid hydration. Although lump formation may be overcome in this way, the formulation still needs relatively large quantities of sugar (about 200% of the starch component).

It has now surprisingly been found that a dispersible starch product comprising essentially a physico-chemical reaction product of gelatinized starch with a mono- and/or diglyceride of a saturated higher fatty acid, and optionally with one or more triglycerides incorporated therein, will need only a small to extremely small addition of sugar as a sweetening agent, whilst lump formation is nevertheless prevented and whilst pyrophosphates alone is sufficient for obtaining a rapid gelation. In fact, the sugar may completely be replaced by an artificial sweetening agent without loss of any important characteristic.

In this way, a product satisfying the highest quality standards may be obtained. It is an object of the invention to provide a dry composition for producing puddings, custard, baby food and the like, that comprises only relatively small proportions of sugar without, nevertheless, showing lump formation on addition of milk or another aqueous liquid.

Further, it is an object of the invention to provide a dry composition for producing puddings, custard, baby food and the like, that comprise only pyrophosphates and yet will show a good gelation of its milky pastes made from the dry composition.

A further object of the invention is to provide a process for preparing a dry composition for puddings, custard, baby food and the like, which dry composition will comprise only relatively small proportions of sugar without showing lump formation on addition of milk or another aqueous liquid.

A still further object of the invention is to provide a process of preparing a dry composition for puddings, custard, baby food and the like, that will only comprise pyrophosphates instead of a mixture of pyrophosphates and orthophosphates and yet will show a good gelation of milky pastes made from the dry composition and milk or another aqueous liquid.

The first starting material for preparing the compositions of the invention is a dispersible starch product comprising essentially a physico-chemical reaction product of a dry gelatinized starch material selected from the group of gelatinized starch, gelatinized starch-containing flour and gelatinized conversion products of starch and starch-containing flour, with a glyceride material selected from the group of mono- and diglycerides of a saturated higher fatty acid. Another glyceride material selected from triglycerides may also be incorporated in the reaction product. Such a product may be prepared by intimately mixing a native starch with a finely divided monoglyceride, e.g. glycerol monostearate and by subjecting the mixture to a heat treatment with simultaneous removal of water. Instead of native starch, there may also be used starch-containing flour, and conversion products of starch and starch-containing flour, whilst the monoglyceride may be substituted at least in part by a diglyceride and may also have some triglycerides added thereto. Further details of this preparation process may be derived from my copending application Ser. No. 484,735 of even date directed to a "cold-water-dispersible starch product." The cold-water-dispersible starch material may be used as such or in a finely ground state and will show by itself substantially no formation of lumps on addition of water.

The second starting material is powdered sugar. The quantity thereof to be used is dependent from the state of division of the dispersible starch product but in a preferred embodiment, there is used from 25 to 50 grams of finely milled sugar on every 25 to 50 grams of dispersible starch product.

The third base material is an alkalimetal pyrophosphate, preferably sodium pyrophosphate, which can be used without any addition of orthophosphate. It is advisable to use this component only in pudding and custard compositions. The amount of pyrophosphate to be used may vary between wide limits and is preferably about 2 grams of pyrophosphate on every 1 to 50 grams of dispersible starch product.

After mixing the two or three base components, the resulting product is ready for use as a dry pudding or custard composition or a dry baby food composition.

If a quantity of powdered milk is incorporated in the mix, it is capable of giving a consumable food composition already on addition of water.

The invention will be illustrated by the following specific examples.

Example I

An emulsion is made from 80 kilograms of a mixture of glycerol monostearate and glycerol distearate (comprising about 90% of monostearate) and sufficient water to give a total volume of 1100 liters.

85 liters of this emulsion are added while agitating to a suspension of 900 kilograms of corn starch (containing 12% of moisture) in 1250 liters of water and the mixture is thoroughly agitated for another hour. Thereafter the resulting aqueous starch-glycerides-suspension is passed on a heated roller drier where it is reacted, gelatinized and dried.

The gelatinized and dried reaction product is ground to a particle size of about 200 mesh, giving a cold-water-dispersible starch product having the desired characteristics.

To 25 grams of the cold-water-dispersible starch product obtained in this way is admixed 1 gram of sodium pyrophosphate and 25 grams of finely milled sugar. There is obtained a dry pudding composition which upon addition of half a liter of milk will rapidly gelate to a pudding of the desired smoothness and texture.

Example II

An emulsion is made from 80 kilograms of a mixture of glycerol monostearate and glycerol distearate (containing about 90% of monostearate) and sufficient water to give a total volume of 1100 liters.

320 kilograms of arachis oil are heated to 50° C. and added to the stirred emulsion. Stirring is continued for some time till the oil is completely emulsified. On cooling, a stable emulsion is obtained.

85 liters of this combined glycerides-emulsion are added while stirring to a suspension of 900 kilograms of rice flour in 1250 liters of water and the mixture is thoroughly stirred for another hour. Thereafter, the resulting aqueous starch-glycerides-suspension is passed on a heated roller drier where it is reacted, gelatinized and dried.

The gelatinized and dried reaction product is ground to a particle size of about 200 mesh in order to give a cold-water-dispersible starch product of desired characteristics.

To 25 grams of this cold-water-dispersible starch product is admixed 1 gram of sodium pyrophosphate and 25 grams of finely milled sugar. There is obtained a dry pudding composition which upon addition of half a liter of milk will rapidly gelate to a pudding of the desired smoothness and texture.

Example III

The process of Example II is repeated but without addition of sodium pyrophosphate. This gives an excellent baby food composition.

Having now described the invention in specific details and exemplified the manner in which it may be carried into practice, it will be readily apparent to those skilled in the art that innumerable variations, applications, modifications, and extensions of the basic principles involved may be made without departing from its spirit or scope.

What I claim is:

1. A dry composition for producing puddings, custard, and baby food, comprising a finely milled cold-water-dispersible starch product, being essentially a physico-chemical reaction product of a dry gelatinized starch material selected from gelatinized starch, gelatinized starch-containing flour and gelatinized conversion products of starch and starch-containing flour, with a glyceride material selected from the group of mono- and diglycerides of a saturated higher fatty acid, and further comprising a finely-divided sugar in a proportion of from 25 to 50 grams of sugar on every 25 to 50 grams of cold-water-dispersible starch product.

2. A dry composition for producing puddings, custard, and baby food, comprising a finely-milled cold-water-dispersible starch product being essentially a physico-chemical reaction product of a dry gelatinized starch material selected from the group of gelatinized starch, gelatinized starch-containing flour and gelatinized conversion products of starch and starch-containing flour, with a first glyceride material selected from the group of mono- and diglycerides of a saturated higher fatty acid, and a second glyceride material selected from the group of triglycerides, and further comprising a finely-milled sugar in a proportion of from 25 to 50 grams of sugar on every 25 to 50 grams of cold-water-dispersible starch product.

3. A dry composition for producing puddings, and custard, comprising a finely-milled cold-water-dispersible starch product being essentially a physico-chemical reaction product of a dry gelatinized starch material selected from the group of gelatinized starch, gelatinized starch-containing flour and gelatinized conversion products of starch and starch-containing flour, with a glyceride material selected from the group of mono- and di-glyceride of a saturated higher fatty acid, and further comprising a finely-milled sugar in a proportion of from 25 to 50 grams of sugar on every 25 to 50 grams of cold-water-dispersible starch product, and an alkalimetal pyrophosphate in a proportion of about 2 grams to every 1 to 50 grams of cold-water-dispersible starch product.

4. The product of claim 3, wherein said alkalimetal pyrophosphate is sodium pyrophosphate.

5. A process for preparing a dry composition for puddings, custard, and baby food, comprising taking a finely-milled cold-water-dispersible starch product being essentially a physico-chemical reaction product of a dry gelationized starch material selected from the group of gelatinized starch, gelatinized starch-containing flour and gelatinized conversion products of starch and starch-containing flour, with a glyceride material selected from the group of mono- and diglycerides of saturated higher fatty acids, and mixing said cold-water-dispersible starch product with a finely-milled sugar in a proportion of from 25 to 50 grams of sugar on every 25 to 50 grams of cold-water-dispersible starch product.

6. A process of preparing a dry composition for pudding, custard, and baby food, comprising taking a finely-milled cold-water-dispersible starch product being essentially a physico-chemical reaction product of a dry gelatinized starch material selected from the group of gelatinized starch, gelatinized starch-containing flour and gelatinized conversion products of starch and starch-containing flour, with a first glyceride material selected from the group of mono- and diglycerides of a saturated higher fatty acid, and a second glyceride material selected from the group of triglycerides, and mixing said cold-water-dispersible starch product with a finely-milled sugar in a proportion of from 25 to 50 grams of sugar on every 25 to 50 grams of cold-water-dispersible starch product.

7. A process of preparing a dry composition for puddings, and custard, comprising taking a finely-milled cold-water-dispersible starch product being essentially a physico-chemical reaction product of a dry gelatinized starch material selected from the group of gelatinized starch, gelatinized starch-containing flour and gelatinized conversion products of starch and starch-containing flour, with a glyceride material selected from the group of mono- and diglycerides of a saturated higher fatty acid, and mixing said cold-water-dispersible starch product with a finely-milled sugar in a proportion of from 25 to 50 grams of sugar on every 25 to 50 grams of cold-water-dispersible starch product and with an alkalimetal pyrophosphate in a proportion of about 2 grams on every 1 to 50 grams of cold-water-dispersible starch product.

8. The process of claim 7, wherein the alkalimetal pyrophosphate is sodium pyrophosphate.

References Cited

UNITED STATES PATENTS

| | | | |
|---|---|---|---|
| 2,554,143 | 5/1951 | Hinz et al. | 99—139 |
| 2,901,355 | 8/1959 | Bangert et al. | 99—139 |

A. LOUIS MONACELL, *Primary Examiner.*

J. HUNTER, *Assistant Examiner.*